United States Patent Office 2,718,755
Patented Sept. 27, 1955

2,718,755

GAS TURBINE PLANT ADAPTED FOR USE WITH NATURAL SOURCE OF NON-COMBUSTIBLE GASES

László Heller, Budapest, Hungary, assignor to "Licencia" Talalmanyokat Ertekesito Vallalat, Budapest, Hungary Application January 28, 1952, Serial No. 268,626

Claims priority, application Hungary January 29, 1951

5 Claims. (Cl. 60—39.18)

This invention concerns improvements in gas-turbine plants by means of a natural source of high pressure non-combustible gases to reduce the size of the air compressor of the plant.

Gas-turbine plants or gas-turbines hitherto known are provided with an air compressor the air delivery of which is considerably greater than required for complete combustion of the fuel necessary to provide the combustion gases which operate the gas-turbine unit of such plants or gas-turbines. The surplus amount of compressed air is needed for cooling down the combustion gases the temperature of which would be too high for being admitted in the presence of the usual construction materials of the gas-turbine unit. Thus, the amount of air compressed by the compressor is only partly used for effecting the combustion while a considerable other part thereof serves for being mixed with the high temperature combustion gases so as to cool them down to a predetermined initial temperature of expansion throughout the gas-turbine unit as it is well known in the art.

Obviously, compression of the surplus air decreases the total output of the gas-turbine plant or gas-turbine since this output is determined by the difference between the output of the gas-turbine unit and that part of the output consumed by the compressor. Thus, an increase of the total output of such plants or gas-turbines might be attained by decreasing the input of the compressor.

The present invention provides for increasing the output of gas-turbine plants by relieving their air compressor from compressing the above mentioned surplus air. The invention is based upon the discovery that the surplus quantity of air may be substituted by a corresponding amount of non-combustible gas which is available at the final pressure of compression, i. e. practically at the pressure at which combustion takes place. Such sources of non-combustible gases are constituted e. g. by natural gas wells issuing high pressure non-combustible gases such as carbon dioxide or nitrogen, or a mixture thereof with a combustible gas, e. g. methane.

Accordingly the main object of the present invention is to provide a gas-turbine plant utilizing a source of high pressure non-combustible gas so as to relieve the compressor from delivering the above mentioned surplus quantity of air by substituting the latter by a corresponding amount of non-combustible gas of suitable pressure. Thus the compressor needs a comparatively lower input whereby a corresponding increase of the total output of the entire gas-turbine plant can be obtained.

Obviously, the pressure of the non-combustible gas source may be higher than the predetermined pressure of compressed combustion air. In such cases the above apparatus is supplemented in accordance with a further object of the invention by means reducing the pressure of the quantity of non-combustible gas to said predetermined pressure value in a manner to obtain additional power. Thus, a further increase of the total output of the entire gas-turbine plant can be attained.

A further object of the present invention provides for preheating the non-combustible gas before pressure reduction thereof in a regenerator by waste gases emitted by the gas-turbine unit. This preheating may be necessary in cases, where the original temperature of the non-combustible gas is too low for direct pressure reduction.

A further object of the present invention provides for compact construction of the plant.

Finally, the present invention provides also a gas-turbine for use in gas-turbine plants as disclosed above. Obviously, gas-turbines constructed in accordance with the present invention generally differ from those heretofore known in that they cannot be worked without an additional gas source of suitable pressure. The main characteristic feature of this invention consists of using a compressor of comparatively small size the air delivery of which is insufficient for the indispensable cooling down of the combustion gases.

Other objects of the present invention will appear from the more detailed description of preferred embodiments thereof, reference being taken to the accompanying drawing in which.

Figure 1:
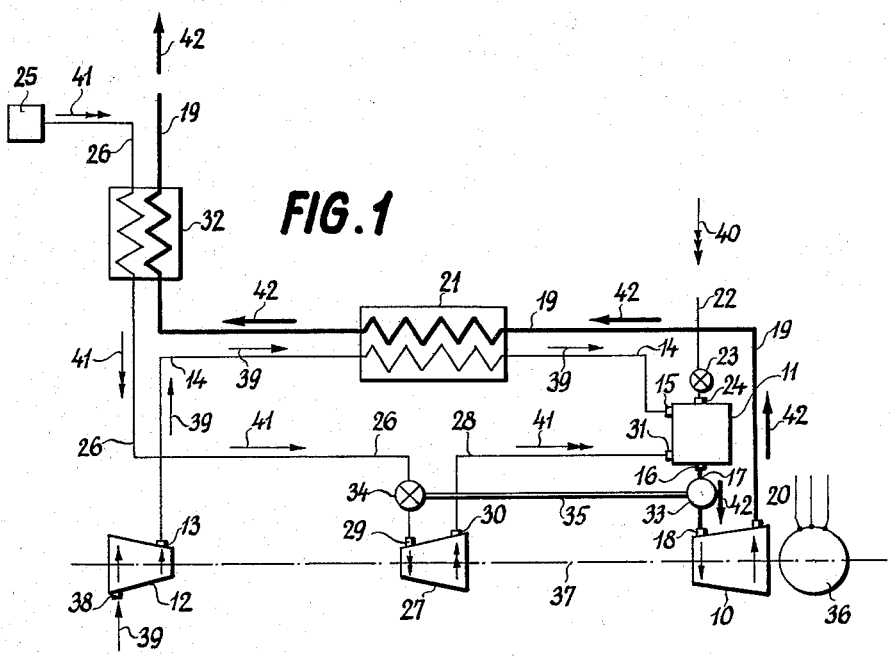
Fig. 1 is a diagrammatic view of an embodiment of a gas-turbine plant established in compliance with the present invention.

Referring to Fig. 1, reference numeral 10 designates a gas-turbine unit which is associated with a combustor 11 and an air compressor 12 all known in the art. An outlet 13 of air compressor 12 is connected by a pipe conduit 14 to an intake 15 of combustor 11. Outlet 16 of combustor 11 is, in turn, connected by a pipe conduit 17 to an intake 18 of gas-turbine unit 10. A further pipe conduit 19 is connected to an outlet 20 of gas-turbine unit 10 and communicates with the atmosphere. In the represented embodiment both pipe conduits 14 and 19 are led through a regenerator 21 as it is well known in the art. Fuel is supplied into combustor 11 by means of a pipe conduit 22 through an inlet valve 23 and a fuel intake 24 in the usual manner. The size of air compressor 12 is—in compliance with an important feature of the present invention—selected so as to deliver such an amount of compressed air only as is needed for complete combustion of fuel supplied into combustor 11. Thus, the temperature of the resulting combustion gases would be too high for being directly introduced into gas-turbine unit 10.

In order to decrease the temperature of the combustion gases to the permissible operating temperature for the gas-turbine unit 10, the combustion gases will—according to a further important feature of the invention—be mixed with a suitable amount of additional non-combustible gas. To this purpose a high pressure non-combustible gas source 25 is connected by a suitably selected supply duct means to combustor 11. In the represented embodiment this supply duct means consists of a pipe conduit 26, an expansion turbine 27, and a further pipe conduit 28. Pipe conduit 26 is connected to an intake 29 of expansion turbine 27, pipe conduit 28 being inserted between an outlet 30 of expansion turbine 27 and a further intake 31 of combustor 11. Pipe conduit 26 meets pipe conduit 19 in another regenerator 32.

Expansion turbine 27 works as a pressure reducing means by which the high pressure of the gas issuing from gas source 25 is decreased to the pressure value prevailing in combustor 11. At the same time, it works also as a pressure control means since the final pressure value of expansion will necessarily correspond to that prevailing in combustor 11 which forms an exhaust chamber for expansion turbine 27. Obviously, if the pressure of gas source 25 is equal to that prevailing in combustor 11, expansion turbine 27 with regenerator 32 may be dispensed with. On the other hand, expansion turbine 27 furnishes additional power by converting the pressure drop therein into a turning moment so that it is to be preferred to other pressure reducing means such as throttle valves. When such valves are used, regenerator 32 is not needed because its purpose is to increase the output of expansion turbine 27.

Since the temperature of the combustion gases may vary, the amount of the additional gas has to be regulated so as to increase or decrease, respectively, as the said temperature rises above its predetermined value or sinks therebelow. In the represented embodiment such regulation is effected by control means which comprise a heat sensitive element 33 such as a bi-metallic thermostat inserted into pipe conduit 17 and an inlet valve 34 inserted into pipe conduit 26, the two co-operating with each other in any usual manner which is indicated by a connection 35.

A power outlet for the gas-turbine plant illustrated is referred to by reference numeral 36 which designates—by way of example—a three phase synchronous generator. Dotted line 37 indicates that compressor 12, expansion turbine 27, gas-turbine 10 and generator 36 are in positive mechanical relationship.

In operation, air compressor 12 draws in air through its intake 38 and compresses it to a predetermined pressure, say 5 kg. per cm.$^2$ (absolute pressure). The compressed combustion air is delivered through outlet 13, pipe conduit 14 and intake 15 from air compressor 12 into combustor 11. The air flow is indicated by single-pointed thin arrows 39. In combustor 11 the compressed air contacts with the fuel, e. g. gasolene, introduced through pipe conduit 22, inlet valve 23 and intake 24 in the usual manner as indicated by a three-pointed thin arrow 40. With regard to the suitably selected amount of combustion air complete combustion takes place. The high temperature—normally more than 1000° C. (Celsius)—of the resulting combustion gases will be reduced to a predetermined value, say 730° C., which may be tolerated in the gas-turbine unit 10 by mixing a suitable amount of non-combustible gas delivered by gas source 25 through pipe conduit 26, inlet valve 34, expansion turbine 27, pipe conduit 28 and intake 31 to the combustion gases. The gas flow is indicated by double pointed thin arrows 41. Gas source 25 is a natural carbon dioxide well of say 100 kg. per cm.$^2$ pressure. This pressure of 100 kg. per cm.$^2$ is reduced in expansion turbine 27 to the predetermined value of 5 kg. per cm.$^2$ which is prevailing in combustor 11. Thus a corresponding turning moment appears in power outlet 36 as considerable additional power. The amount of the additional gas is regulated by control means 33, 34, the heat sensitive element 33 of which is adjusted to the predetermined temperature of 730° C. If the temperature of the gas mixture consisting of the combustion gases and the additional gas exceeds 730° C., the inlet valve 34 of the control means will admit a larger amount of non-combustible gas to expansion turbine 27 and thereby to combustor 11. Thus the temperature of the gas mixture issuing from combustor 11 sinks till it reaches the predetermined value of 730° C. On the other hand, if the temperature of the gas mixture is less than 730° C., inlet valve 34 throttles pipe conduit 26, thereby decreasing the additional gas amount. Consequently, a relatively lesser amount of non-combustible gases is associated with the fuel introduced and the temperature of the resulting gas mixture rises. Thus the mixture enters gas-turbine unit 10 at a constant predetermined temperature and will expand therein to waste gases in the usual manner providing the main power of the plant thereby. In case of such regulation, when load changes of gas-turbine unit 10 entail a corresponding adjustment of fuel intake 24, the pressure prevailing in combustor 11 and having the above mentioned value of 5 kg. per cm.$^2$ predetermined for normal loads, will accordingly vary as well.

The waste gases leave gas-turbine unit 10 through outlet 20 and pipe conduit 19 passing thereby regenerators 21 and 32, and preheating the combustion air in pipe conduit 14 to say 350° C. and the additional gas in pipe conduit 26 so as to possibly increase the output of expansion turbine 27, respectively. The flow of waste gases is indicated by single pointed thick arrows 42 the last of which designates the exhaust of the plant.

Obviously, gas source 25 might deliver a mixture of combustible and non-combustible gases as well, provided that the non-combustible portion of the mixture is considerable and the pressure thereof is at least as great as that prevailing in combustor 11. High pressure (100 to 120 kg. per cm.$^2$) natural gas wells are frequently of such type in that a mixture of $CH_4$ and $CO_2$ containing respectively 35% and 65% of these gases by volume, respectively, issues from the well and may—after a suitable pressure reduction—be introduced into a combustor of a gas-turbine plant without compression. In such cases a lesser amount of ballast air is needed for cooling purposes whereby the total efficiency of the plant might be increased considerably.

Figure 2:
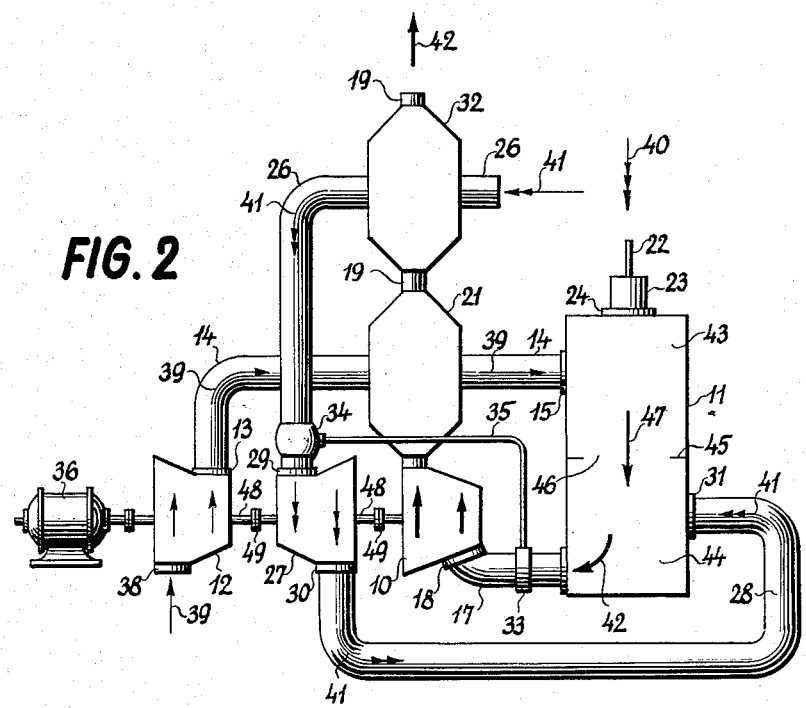
Fig. 2 shows a diagrammatic view of a gas-turbine constructed in accordance with the present invention and adapted to be used in the gas-turbine plant illustrated in Fig. 1.

Referring to Fig. 2, the gas-turbine illustrated therein substantially corresponds to that of Fig. 1. An additional feature thereof is that combustor 11—shown in section—comprises a combustion chamber 43 and a mixing chamber 44 which are separated by a partition 45 with an aperture 46 therein so that the two chambers 43 and 44 communicate with each other through aperture 46. Pipe conduit 14 delivering the compressed combustion air terminates in combustion chamber 43, whereas pipe conduit 28 supplying the additional gas is connected to mixing chamber 44. Obviously, the fuel amount supplied into combustion chamber 43 will be burnt therein with the combustion air to combustion gases, the combustion being complete. The high temperature combustion gases withdraw from combustion chamber 43 through aperture 46, as indicated by arrow 47, and enter mixing chamber 44 where the combustion gases will be thoroughly mixed with the additional gas issuing from pipe conduit 28. The temperature of the resulting mixture sinks thereby as described above.

As shown in the drawing, air compressor 12, expansion turbine 27 and gas-turbine unit 10 have a common drive shaft 48 subdivided by clutches 49 into coupled sections, each for a machine unit, in the usual manner. In the illustrated embodiment generator 36 is directly coupled by a further clutch 49 to the common drive shaft 48 of the gas-turbine which, otherwise, is quite similar to that described with reference to Fig. 1.

Having thus particularly described the present invention with reference to its preferred forms, it will be obvious to those skilled in the art that other changes and modifications may be made therein without departing from the spirit and scope thereof.

What is claimed is:

1. A gas-turbine plant for use in connection with a natural source of high pressure non-combustible gas, comprising in combination with a gas turbine an air compressor for compressing a quantity of combustion air to a predetermined pressure, a combustor adapted to receive said compressed combustion air from said compressor and to burn fuel therewith to form combustion gases, said compressor being limited to the size required to deliver the correct amount of combustion air for complete combustion of said fuel, supply duct means connected to said combustor for supplying non-combustible gas from said natural gas source into said combustor to cool said combustion gases to a predetermined temperature by forming a mixture therewith, an expansion turbine inserted into said supply duct means for decreasing the pressure of said non-combustible gas to said predetermined pressure value and providing additional power thereby, control means for regulating the amount of non-combustible gas as a function of said predetermined temperature in a manner to hold the temperature at a constant value, said gas-turbine being operated by said mixture issuing from said combustor and being adapted to drive said compressor, whereby the pressure of said natural gas source is substituted for the pressure saved in said compressor.

2. A gas-turbine plant for use in connection with a natural source of high pressure non-combustible gas, comprising in combination with a gas turbine an air compressor for compressing a quantity of combustion air to a predetermined pressure, a combustor adapted to receive said compressed combustion air from said compressor and to burn fuel therewith to form combustion gases, said compressor being limited to the size required to deliver the correct amount of combustion air for complete combustion of said fuel, supply duct means connected to said combustor for supplying non-combustible gas from said natural gas source into said combustor to cool said combustion gases to a predetermined temperature by forming a mixture therewith, an expansion turbine inserted into said supply duct means for decreasing the pressure of said non-combustible gas to said predetermined pressure value and providing additional power thereby, control means for regulating the amount of non-combustible gas as a function of said predetermined temperature in a manner to hold the temperature at a constant value, said gas-turbine being operated by said mixture issuing from said combustor and being adapted to drive said compressor, whereby the pressure of said natural gas source is substituted for the pressure saved in said compressor, a regenerator inserted between said gas source and said expansion turbine, and exhaust duct means for waste gases emitted by said gas-turbine, both said supply duct means and said exhaust duct means being led through said regenerator so as to preheat said non-combustible gas amount before entering said expansion turbine thus increasing the output thereof.

3. A gas turbine plant for use in connection with a natural source of high pressure non-combustible gas comprising in combination with a gas turbine an air compressor for compressing a quantity of combustion air to a predetermined pressure, a combustor adapted to receive said compressed combustion air from said compressor and to burn fuel therewith to form combustion gases, said compressor being limited to the size required to deliver the correct amount of combustion air for complete combustion of said fuel, supply duct means connected to said combustor for supplying non-combustible gas from said natural gas source into said combustor at said predetermined pressure to cool said combustion gases to a predetermined temperature by forming a mixture therewith, engine means inserted into said supply duct means for decreasing the pressure of said non-combustible gas to said predetermined pressure value and providing additional power thereby, control means for regulating the amount of non-combustible gas as a function of said predetermined temperature in a manner to hold the latter at a constant value, said gas-turbine being operated by said mixture issuing from said combustor and being adapted to drive said compressor, whereby the pressure of said natural gas source is substituted for the pressure saved in said compressor.

4. A gas turbine plant for use in connection with a natural source of high pressure non-combustible gas comprising in combination with a gas turbine an air compressor for compressing a quantity of combustion air to a predetermined pressure, a combustor adapted to receive said compressed combustion air from said compressor and to burn fuel therewith to form combustion gases, said compressor being limited to the size required to deliver the correct amount of combustion air for complete combustion of said fuel, supply duct means connected to said combustor for supplying non-combustible gas from said natural gas source into said combustor to cool said combustion gases to a predetermined temperature by forming a mixture therewith, an expansion turbine inserted into said supply duct means for decreasing the pressure of said non-combustible gas to said predetermined pressure value and providing additional power thereby, control means for regulating the amount of non-combustible gas as a function of said predetermined temperature in a manner to hold the temperature at a constant value, said gas turbine being operated by said mixture issuing from said combustor and being adapted to drive said compressor, whereby the pressure of said natural gas source is substituted for the pressure saved in said compressor, exhaust duct means for waste gases emitted by said gas turbine, and regenerator means connected to said exhaust duct means for absorbing the heat of said exhaust gases and for preheating said compressed air before entering said combustor and said non-combustible gas before entering said expansion turbine.

5. A gas turbine plant for use in connection with a natural source of high pressure non-combustible gas, comprising in combination with a gas turbine an air compressor for compressing a quantity of combustion air to a predetermined pressure, a combustor adapted to receive only compressed combustion air from said compressor and to burn fuel therewith to form combustion gases, said compressor delivering the correct amount of combustion air for complete combustion of said fuel, duct means connected to said combustor for supplying non-combustible gas from said natural gas source into said combustor at said predetermined pressure to cool said combustion gases to a predetermined temperature by forming a mixture therewith, control means for regulating the amount of non-combustible gas as a function of said predetermined temperature in a manner to hold the latter at a constant value, said gas turbine being operated by said mixture issuing from said combustor and being adapted to drive said compressor whereby the pressure of said natural gas source is substituted for the pressure saved in said compressor.

References Cited in the file of this patent

UNITED STATES PATENTS

| Number | Name | Date |
|---|---|---|
| 1,978,837 | Forsling | Oct. 30, 1934 |
| 2,016,921 | Goddard | Oct. 8, 1935 |
| 2,078,956 | Lysholm | May 4, 1937 |
| 2,221,185 | Farlow | Nov. 12, 1940 |
| 2,253,809 | Pfenninger | Aug. 26, 1941 |
| 2,469,679 | Wyman | May 10, 1949 |
| 2,568,662 | Sanborn | Sept. 18, 1951 |

FOREIGN PATENTS

| Number | Country | Date |
|---|---|---|
| 151,986 | Great Britain | Dec. 15, 1921 |
| 538,956 | Great Britain | Aug. 22, 1941 |